United States Patent
Tai et al.

[11] Patent Number: 5,812,169
[45] Date of Patent: Sep. 22, 1998

[54] COMBINED STORAGE OF DATA FOR TWO PRINTHEADS

[75] Inventors: Hwai-Tzuu Tai; Richard George Allen, both of Rochester, N.Y.

[73] Assignee: Eastman Kodak Company, Rochester, N.Y.

[21] Appl. No.: 645,989

[22] Filed: May 14, 1996

[51] Int. Cl.$^6$ ...................................................... H04N 1/40
[52] U.S. Cl. ........................... 347/110; 358/448; 382/166
[58] Field of Search ...................... 347/110, 252; 358/298, 528, 530, 448; 382/162, 166, 244, 237; 395/111, 112; 348/420

[56] References Cited

U.S. PATENT DOCUMENTS

| | | |
|---|---|---|
| 5,045,893 | 9/1991 | Tabb . |
| 5,047,955 | 9/1991 | Shope et al. . |
| 5,049,949 | 9/1991 | Parker et al. . |
| 5,208,636 | 5/1993 | Rees et al. . |
| 5,241,356 | 8/1993 | Bray et al. . |
| 5,258,820 | 11/1993 | Tabb . |
| 5,477,317 | 12/1995 | Edmunds et al. . |
| 5,479,175 | 12/1995 | Cianciosi et al. . |
| 5,500,727 | 3/1996 | Maruyama et al. . |
| 5,600,373 | 2/1997 | Chui et al. ............................. 348/397 |

*Primary Examiner*—Peter S. Wong
*Assistant Examiner*—Gregory J. Toatley, Jr.
*Attorney, Agent, or Firm*—Norman Rushefsky

[57] ABSTRACT

A method and apparatus for processing image data representing plural colors for output to a color display device such as a printer or soft display. A block of digital image data signals is generated representing rasterized image data of at least two colors. The block of digital image data is compressed and stored in a compressed form. The compressed image data is then expanded losslessly and output to a color display device.

35 Claims, 9 Drawing Sheets

COMBINED STORAGE OF DATA FOR TWO PRINTHEADS

BACKGROUND OF THE INVENTION

1. Field of the Invention

This invention relates generally to the printer arts and more particularly to printing systems which employ at least two printheads to create images having plural colors.

2. Description Relative to the Prior Art

In the prior art, it is well known in the xerographic recording arts to create multicolor toner images by forming two unfixed images on a single image frame of a photoconductive image member. Color printers have been marketed using this general approach using, for example, discharged area development (DAD) and electronic exposure by a raster output scanner (ROS) for each image. The advantage of exposing and developing the same image frame for creating the two-color images is that the productivity of the copier and/or printer is enhanced since one image frame is used to record two-color images. In addition to improved productivity, image registration between the two-color images is easier to control and therefore more accurate than in a system where the colors are formed on separate image frames and then registered together when transferred to a record member such as plain paper or to an intermediate member and then to the record member. The recording of two-color images is generally known as highlight color imaging. In highlight color imaging, two different color developers are customarily employed, usually black and some other color; for example, red.

One approach to a single frame two-color image building process is disclosed in U.S. Pat. No. 5,045,893. In this electrophotographic process a mixture of discharged area development and charged area development (DAD and CAD) is employed using two ROS devices. In this process, the image member is charged, then an image area thereon is exposed using a first ROS device and then developed so that the first toner image is made using DAD. The image area is then background area exposed using the second ROS device and then developed with the second image made using CAD. The developed images are transferred to a receiver sheet and then fused to the sheet.

A problem associated with using two or more ROS devices is that a separate marking engine data path is required for each ROS device requiring expensive data storage and processing capabilities.

A similar problem of using two ROS devices is in the field of color ink jet recording wherein ink droplets of varying sizes and of different colors are used to form a plural color image on a recording member.

It is, therefore, an object of the invention to provide a recording apparatus and method featuring plural image exposure devices wherein image data for the exposure devices are processed in an economical manner.

SUMMARY OF THE INVENTION

The above and other objects and advantages which will become apparent from the description of the invention provided herein. In accordance with a first aspect of the invention, there is provided a method of processing image data representing plural colors for output to a color display device, comprising generating a block of digital image data signals representing rasterized image data of at least one pixel said signals representing data for display in at least two colors; compressing the block of digital image data; storing the compressed image data in a compressed form; expanding the compressed image data; and outputting the expanded compressed image data to a color display device.

In accordance with a second aspect of the invention, there is provided a method of processing image data representing plural colors for output to a color display device, comprising:

generating first image data signals representing data for display in two colors, the image data signals representing first pixels of at least one color as grey level image data; recording and developing the data on a first image frame in an electrophotographic marking engine in accordance with a DAD-CAD recording operation wherein the data for one color is recorded using a first printhead and the data for a second color is recorded using a second printhead; transferring the developed image to a first receiver sheet; generating second image data signals representing second image data for display in one color, the image data signals representing second pixels as grey level image data wherein the number of grey levels of said second pixels exceeds the number of grey levels of said first pixels; recording and developing the second image data on a second image frame of said engine using said first printhead and in accordance with a DAD only recording operation; developing the image recorded on the second image frame; and transferring the developed image to a second receiver sheet.

In accordance with a third aspect of the invention, there is provided an apparatus for processing image data representing plural colors for output to a color display device, comprising means for generating a block of digital image data signals representing rasterized image data of at least one pixel, said signals representing data for display in at least two colors; means for compressing the block of digital image data; means for storing the compressed image data in a compressed form; means for expanding the compressed image data; and means for outputting the expanded compressed image data to a color display device.

BRIEF DESCRIPTION OF THE DRAWINGS

In the detailed description of the preferred embodiments of the invention presented below, reference is made to the accompanying drawings in which.

DESCRIPTION OF THE PREFERRED EMBODIMENTS

The methods and apparatus of the preferred embodiments will be described in accordance with an electrophotographic recording medium. The invention, however, is not limited to methods and apparatus for creating images on such a medium, as other media such as ink jet, may also be used with the invention.

Because electrophotographic reproduction apparatus are well known, the present description will be directed in particular to elements forming part of or cooperating more directly with the present invention. Apparatus not specifically shown or described herein are selectable from those known in the prior art.

DETAILED DESCRIPTION OF THE INVENTION

Figure 1:
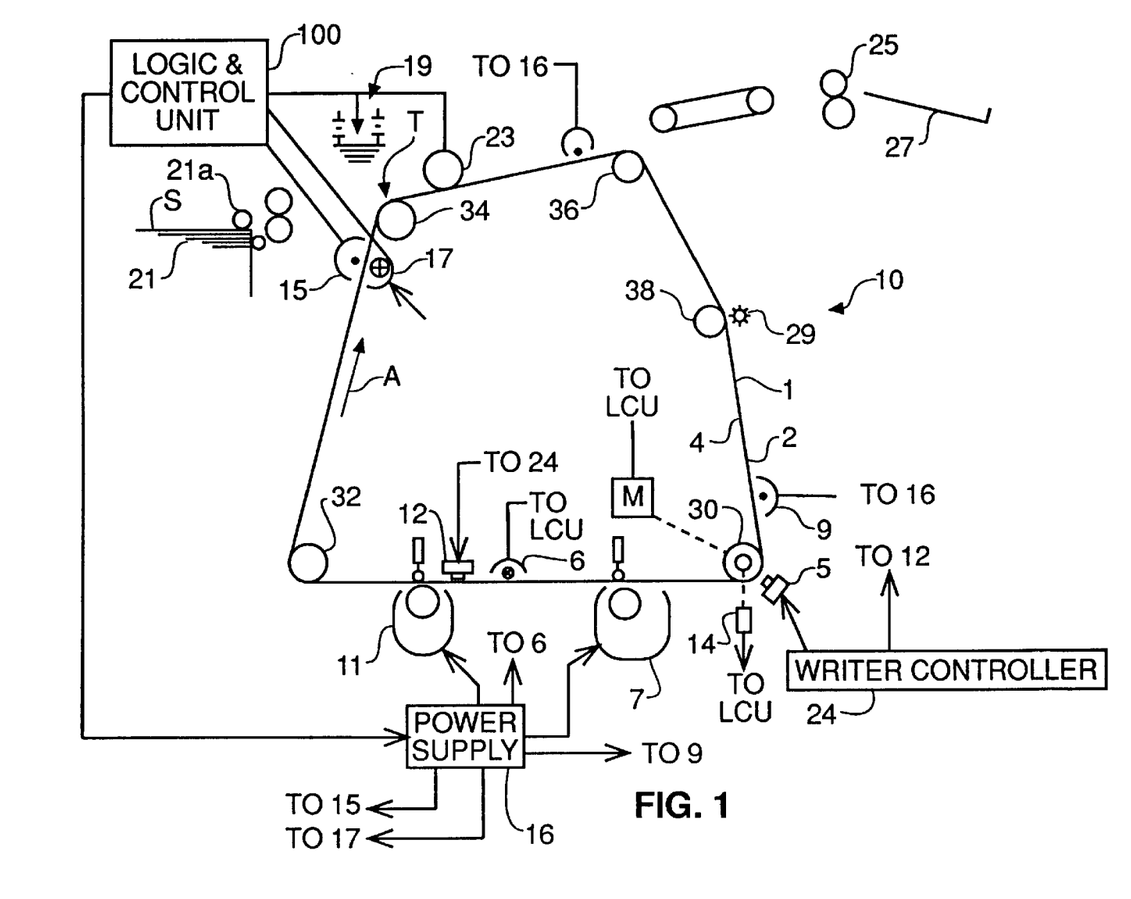
FIG. 1 is an elevation view in schematic of an electrophotographic marking engine forming a part of the invention.

FIG. 1 illustrates an electrophotographic recording apparatus 10 for forming a two-color toned image. According to FIG. 1, a moving image member 1 includes an image side 2 and an opposite or base side 4. In our preferred embodiment, the image member 1 is transparent, however, this is not a requirement. For example, it can be a belt or web image member having a polyester or other suitable transparent support well known and used in the art. Such image members include a transparent conductive layer on the image side 2 upon which is coated a suitable photoconductive layer(s) and an insulating layer to make the image member 1 photoconductive. The conductive layer and photoconductive layers are extremely thin and are not shown in the drawings. The image member 1 is driven in the direction shown by the arrow A by a motor M or other motive source that is coupled in a driving relationship to one or more rollers 30, 32, 34, 36 and 38 about which the belt is entrained. The image member could also be a glass or transparent drum with similar layers coated thereon.

Operation of the apparatus is controlled by a logic and control unit 100 which includes one or more microprocessors programmed as is well known in the art for providing signals in accordance with timed sequences controlled using one or more encoders 14 to selectively control operation of the various workstations described herein. Other stations not described may be provided as is known in the art. The operation of the apparatus will be described with respect to a negative charging image member. It will be clear to those skilled in the art, however, that a positive charging image member could also be used. Reference should also be had to FIGS. 2A through 2F which show in graphical form examples of charging effects in the various steps of the operation of the DAD/CAD apparatus of FIG. 1.

Figure 2A:
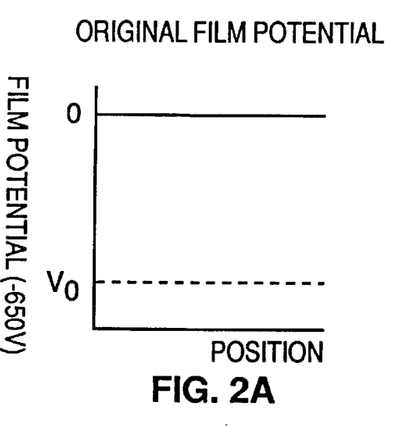
FIGS. 2A–2F are illustrations of voltage levels on a photoconductive belt of the apparatus of FIG. 1 during various stages of forming a DAD-CAD image.
Figure 2B:
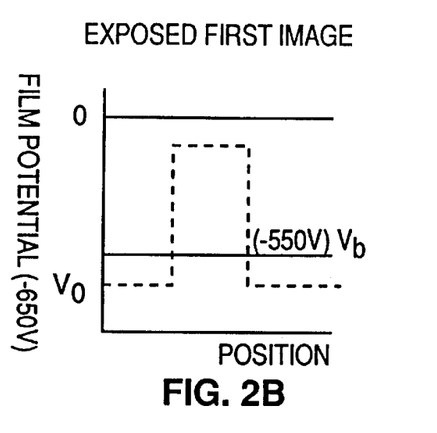
Figure 2C:
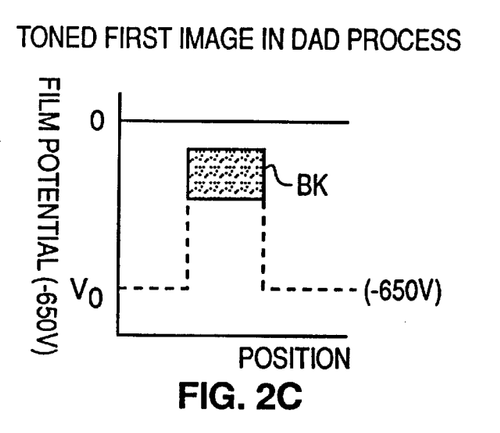

The image member is uniformly charged relative to ground to a negative potential (say −650 volts) by a first primary corona charger 9 (see FIG. 2A). Control of the charger 9 and the other chargers described herein may come from a programmable power supply 16. An image frame on the image member is imagewise exposed by a first ROS device 5 such as an LED or laser printhead to create a negative electrostatic image on the image frame (see FIG. 2B). The imagewise exposure(s) of the ROS devices are generated in response to signals from a writer controller 24. At a development station 7, a negative toner is applied to the image frame in the presence of an electric field which encourages deposition of the negative toner according to the amount of discharge of the electrostatic image. That is, the toner shown in FIG. 1 adheres to areas of lowest potential in the electrostatic image, creating a first toner image, as shown in FIG. 2C, created by a DAD process. In this example, the development station may be electrically biased to $V_b = -550$ volts. The development stations are preferably magnetic brush development stations.

Figure 2D:
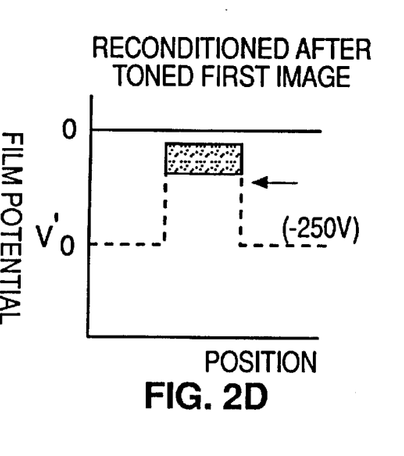
Figure 2E:
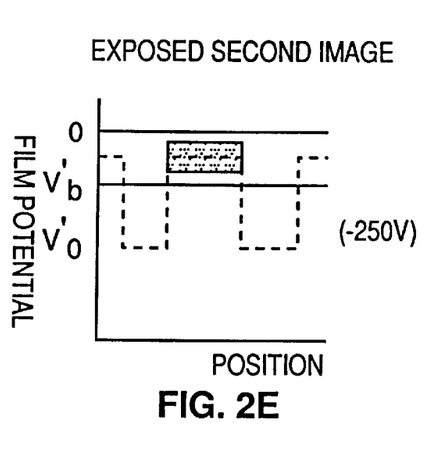

The image frame is then exposed with light from a rear erase lamp 6 to reduce the level of charge thereon to say −250 volts (see FIG. 2D) and then the same image frame is exposed using a second ROS device 12 through its base 4 to create a second electrostatic image (FIG. 2E). The second ROS device also receives signals from a writer controller 24. It is preferred that this exposure be conducted through the base in order to discharge the charge underneath the first toner image below that of exposed areas surrounding the first toner image. If this charge is not dissipated, the negatively charged first toner has a tendency to be pushed by that charge into the areas adjacent to it that have been equally or more discharged, thereby reducing the sharpness and resolution of the first toner image. Exposure through the base allows the adjacent negative charge to hold the negative toner of the first image in place. However, the invention herein contemplates the use of the second ROS exposure device at the same side as the first ROS exposure device.

Figure 2F:
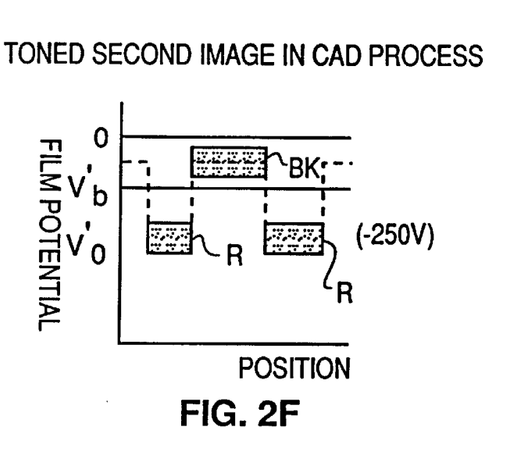

The second electrostatic image on this image frame is then toned using a CAD toning process (FIG. 2F). More specifically, a magnetic brush 11 containing positive toner applies toner to image member 1 in the presence of an electric field that encourages deposition of toner on the high potential portions of the second electrostatic image. Typically, in CAD development, the electric field is biased by a suitable power supply providing a suitable electrical bias to the development station so that magnetic brush 1 is slightly more negative ($V'b$) than the exposed portions of the second electrostatic image to inhibit development of the non-image areas in the second electrostatic image. This electrical bias also inhibits pickup of negative toner from the first image.

Preferably, both toning stations 7 and 11 are constructed to provide a soft magnetic brush having a tendency to cause little disturbance to the first toner image and providing extremely high density at high speed with a relatively small station.

If the colors of the toners in toning stations 7 and 11 are of different color, image member 1 now has a two color image. Obviously, the toners in stations 7 and 11 could be of the same color but different characteristics. For example, one of the two toners could be a black magnetic toner and the other a black non-magnetic toner, which arrangement would have certain advantages in certain processes such as printing of checks. For purposes herein, such a combination of non-magnetic and magnetic black toners is essentially the same as a two color toner image. Similarly, one toner may have color and the other toner may be colorless. Thus, the term "colors" as used herein is not limited to different visible colors but includes other printed combinations as those just described.

The two-color image is made up of toners of both negative and positive polarity owing to having been developed by DAD and CAD processes, respectively. The two-color toner image proceeds to a treatment station made up of a corona charger 15 and an erase lamp 17. Corona charger 15 is biased to change the polarity of one of the toners making up the two color toner image. For example, it may apply a negative charge to the two color image, thereby changing the polarity on the positive toner particles applied at toning station 11 to a negative polarity. As is well known in the art, this process can be assisted by use of an erase lamp 17 positioned at or before the corona charger 15 which reduces the surface potential applied to the non-image areas while encouraging sufficient charge to deposit on the toner intended to be charged.

The treated two-color image proceeds to the transfer station T. The transfer station includes a transfer backing roller 23, where a potential is applied from a reversible potential source 19, encouraging transfer of the toner from a receiving sheet fed from a receiving sheet supply or stack 21.

At the transfer station T, a sheet S of support material is moved into contact with the toner images on the image frame. The sheet of support material is advanced to the transfer station by conventional sheet feeding apparatus, not shown. Preferably, the sheet feeding apparatus includes one or more feed rolls 21a contacting the uppermost sheet of a stack 21 of copy sheets. The feed rolls rotate so as to advance the uppermost sheet from the stack into a chute or guide which directs the advancing sheet of support material into contact with the photoconductive surface of belt 11 in a timed sequence so that the toner powder image developed thereon contacts the advancing sheet of support material at transfer station T. After transfer of the image to the sheet S, the sheet is detacked from the belt 11 and fed into the nip of a pair of fusing rollers that are heated to fuse the toned images to the sheet.

With reference now to FIG. 2A, there is illustrated the film potential Vo after primary corona charge is provided by corona charger 9. Note that typically the applied charge may be slightly higher than the illustrated −650 volts relative to ground due to dark discharge as is well known. In FIG. 2B, there is illustrated the effect on this primary charge of a $D_{MAX}$ exposure by exposure device 5. The potential in the exposed area is reduced substantially say to about −100 volts. With the bias on development station, $V_b$, set at about −550 volts the exposed image area is developed with a first colored toner, say black (FIG. 2C). Note that a $D_{MAX}$ exposure is not required but that the exposure may be made that reduces the charge level below that of $V_b$; i.e., closer to ground. In accordance with the invention herein, the ROS devices are preferably both grey level exposure devices. Thus, exposure from these devices can provide, in accordance with gray level image data, varying levels of exposure for each pixel to generate different tonal qualities to the image. In FIG. 2B, the exposed pixel areas can be exposed to varying levels in accordance with the gray level image data but each of such exposures should reduce the respective area to below that of $V_b$. In FIG. 2D, light from a rear erase lamp 6 has exposed the image frame to reduce potential in the ROS unexposed areas to a potential of $V'_0$=−250 volts relative to ground. Since the erase is from the rear, the level of charge of the black toned image area is also reduced. The bias, $V'_b$, of development station 11 is controlled to be about −100 volts. With reference to FIG. 2E, an imagewise exposure from ROS exposure device 12 reduces the level of charge in the exposed area to between ground and $V'_b$. The areas exposed by exposure device 12 to below $V'_b$ are areas of the image frame where toner from development station 11 is not to be deposited. Thus, the areas exposed by the second ROS device 12 includes areas beneath the first toned image as well as areas that are not to be developed at all. Areas left unexposed are developed with a positively charged toner from development station 11 which say is red (R). Alternatively, the second ROS device 12 need not expose areas beneath the first developed image and just expose those areas that are not to be developed in red. In order to provide for gray level rendering of the red and black developed areas, the ROS devices 5 and 12 may each have the capability to generate exposures at different intensity levels or exposure durations to expose pixels which will develop in different densities. However, the available level for creation of the black pixels in this example will vary from exposures that cause decrease in $V_0$ to a range between about −100 volts and about −500 volts. The available levels for creation of the red pixels in this example will vary from a range that includes exposures that cause exposed pixel areas to be about −150 volts to no exposure with $V'_0$ being about −250. As may be seen in FIG. 2F, development has occurred in the areas having a voltage potential greater than $V'_b$.

Figure 3:
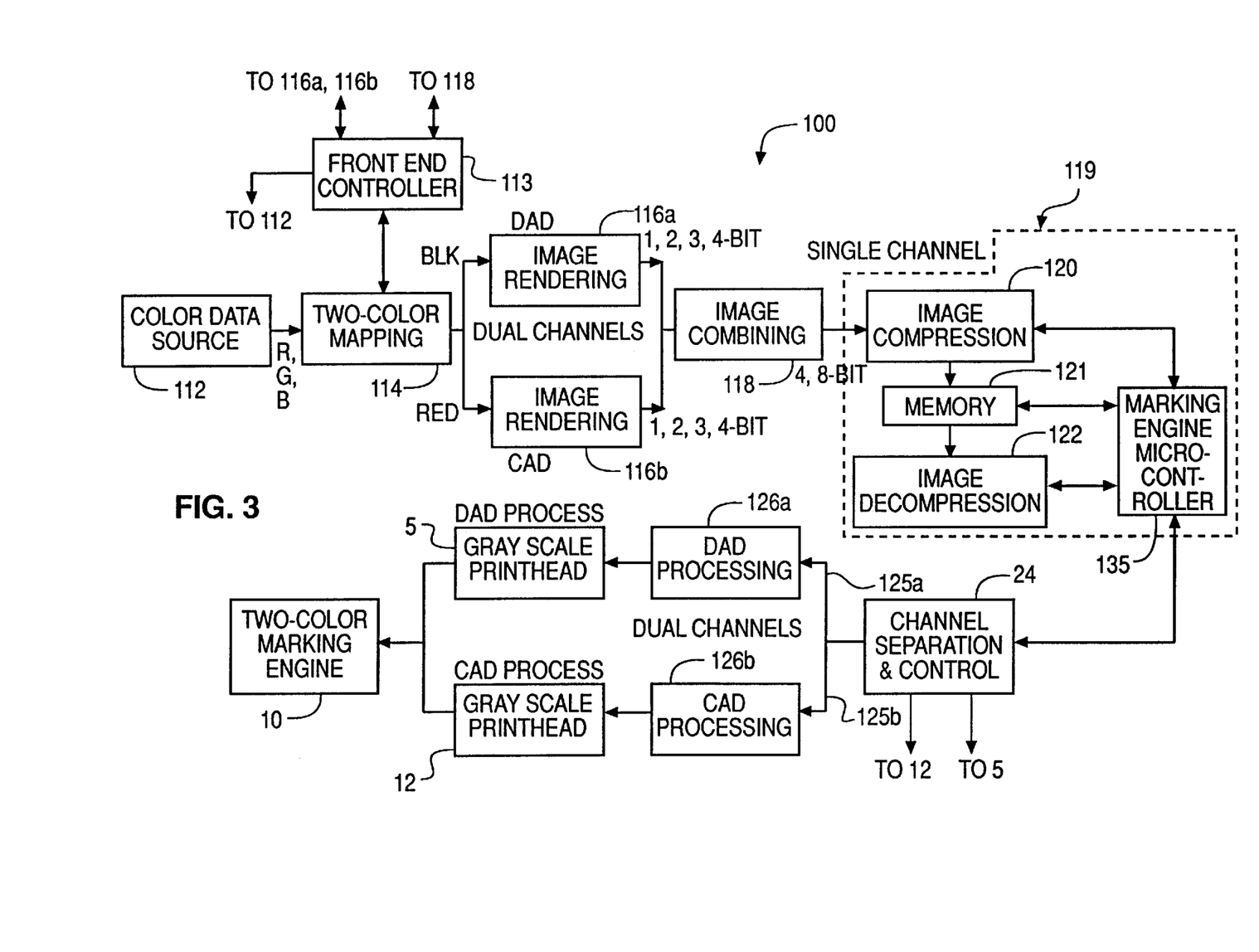
FIG. 3 is a block diagram of an image processing apparatus for processing image data in accordance with the invention for recording on the apparatus of FIG. 1.

In accordance with the objects of the invention, there is provided an improved means and method for economically processing the image data to the ROS devices 5 and 12. With reference now to FIG. 3, there is shown a block diagram of a system for processing image data in accordance with the invention.

A data source 112 may take the form of a document scanner, computer, word processor or optical or magnetic data reader, etc. that provides color data information of an image to be recorded in rasterized form. In this example, the data for each pixel is defined in R, G, B (red, green, blue, respectively) color space; however, data in other known color spaces could also be provided. Where the data is defined in a color space of more than two dimensions or more than two colors, transformation is made by a two-color mapper 114. Two-color mappers are commercially available for taking say a Postscript file in R, G, B and mapping same into black and one other color such as red. The mappers may be in software form or in hardware form. Control of the various image processors forming a part of the front-end of the image processing may be provided by a suitably programmed computer-based front-end controller 113. The mapper may operate by performing a calculation on the input data or may be in the form of a look-up table wherein incoming R, G, B signals for each pixel are output as two signals representing the pixel in black and red space. The mapper may also be provided with adjustments for gamma correction. Where the black and red signals are not yet in device dependent form they may be rendered through a thresholding operation which is indicated in blocks 116a, 116b. The respective signals R, G, B may each be in 8-bit form as are each of the black, red signals input to the image rendering blocks. In rendering the pixel image data there is a need to convert the input pixel data to the number of grey levels printable by each of the respective ROS devices or printheads. Assume in this example the number of grey levels for each color is 4-bits per pixel. The image rendering blocks thus may be conventional grey level thresholding devices such as look-up tables or logic devices, or implemented via software that through thresholding or a quantization operation redefine each 8-bit black color component of the pixel as a 4-bit black color component of the pixel, and each 8-bit red color component of the pixel as a 4-bit red color component of the pixel. These are referred to as components of the pixel since each picture element area in this example, has both a black and a red data component. The two 4-bit color components for each pixel are combined into an 8-bit signal by image combining device 118 which provides a fixed ordering to the 8-bit signal. For example, the 8-bit signal may have an order such that the first block of four bits represents the four bit signal defining the density of the black color component and the second block of four bits represents the four bit signal defining the density of the red color component. The order of a predetermined arrangement is not critical as long as separation can be provided subsequent to storage as will be described. Alternatively, combination into an 8-bit per pixel form need not be provided as the 4-bit pixel components may be output in an alternating form; i.e., first one color component then the other color component, to an image compression device 120. The combined 8-bits/pixel signal or alternatively the separate 4-bit color component signals are input to a job image buffer (JIB) 119 that includes the compression device 120 that comprises circuitry or software for compressing the signal according to a compression algorithm. A preferred compression algorithm implemented by the compression device is of the "lossless" type which compress strings of digital bits in such manner that when expanded reproduce the original string without error. Examples of known "lossless" compression algorithms are Lempel-Zev, Q-coder and other arithmetic encoders. After compression, the compressed data is stored in a memory 121 also forming a part of the JIB. The memory may be semiconductor memory such as DRAM and also include disk storage. The memory is preferably of sufficient capacity to store in compressed rasterized form multiple pages of image data for production of collated sets of a mult-page document using electronic collation, see in this regard U.S. Pat. No. 5,047,955, the contents of which are incorporated herein by reference. Each page is called up for printing by the marking engine microcontroller 135 which directs data for the appropriate page to be output to an image decompression device 122. The decompression device may be software operated or hardware circuitry and may be integrated with the image compression device 120. The decompression device expands the compressed image data being output from memory 121 into its original bit string form, say of 8-bit bytes, each representing 4-bits of red component color information and 4-bits of black color component information. A channel separation device and writer controller 24 may include a demultiplexer or switching arrangement that separates the 4-bits color component signals into two separate color channels 125a, 125b, one for each color. After separation, each 4-bits per pixel color component signal is subject processing in respective processors 126a, 126b for correction in accordance with the specific exposure process to be used for that color (i.e., DAD or CAD exposure) and the type of printhead. Where the printheads 5, 12 are each LED printheads, correction may be made for nonuniformity of the different LEDs as is known in the prior art. One or both of the printheads may be grey level laser devices in the alternative. Data representing a line of respective color component pixels to be recorded by each printhead may be sent to the respective printhead and recorded at suitable times as is known. Where the color marking engine 10 operates in accordance with electrophotographic principles as described in FIG. 1, the respective exposed areas of a photoconductor are developed with the respective toners in the same image frame and transferred to a record member such as plain paper or a transparency upon which the two-color image is fused for permanency.

Figure 4A:
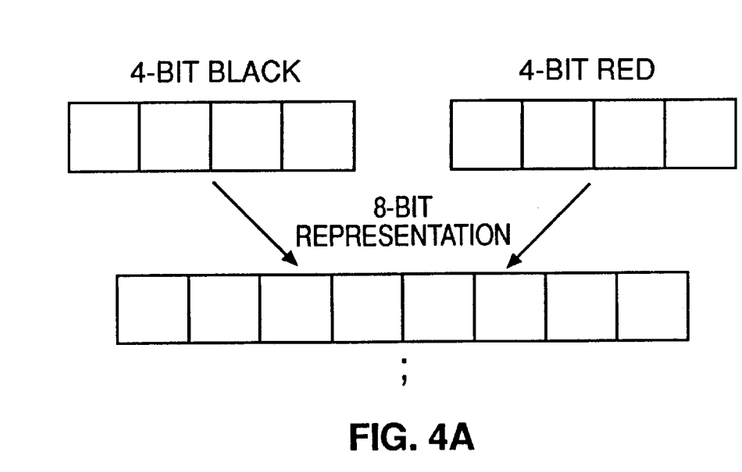
FIGS. 4A–4D are illustrations of examples of bit depths for each color in a DAD-CAD process that may be accommodated by the method and apparatus of the invention.
Figure 4B:
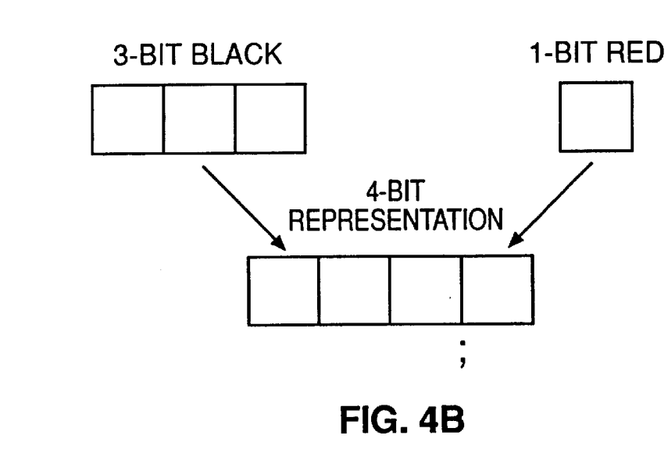
Figure 4C:
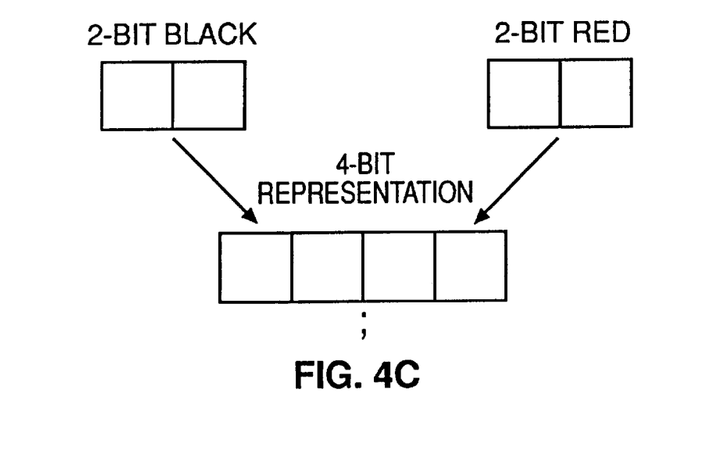
Figure 4D:
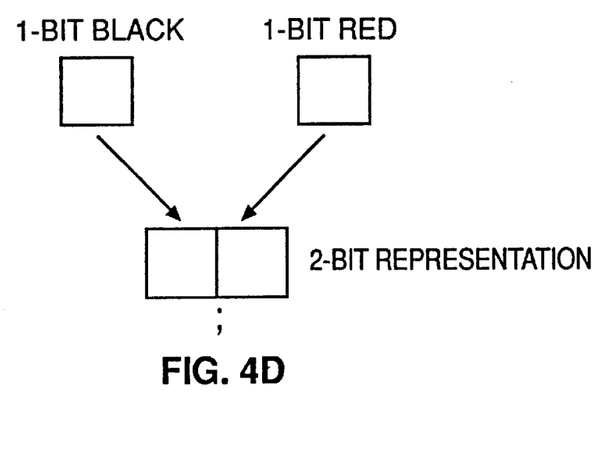

In the embodiment described above, the respective pixel color component signals are used to record overlapping pixel areas of the photoconductor. While this embodiment features a 4-bits per pixel color component (after rendering or thresholding) for each of the two colors, and 8-bit representation when combined, this is only one example, see FIG. 4A. Other examples are illustrated in FIGS. 4B where the combined color components for each pixel area are of 4-bits size with 3-bits per pixel color component assigned to black and 1-bit per pixel color component assigned to red. In FIG. 4C, the combined color components for each pixel area are also of 4-bits size with 2-bits per pixel color component being assigned to red and two bits to black. Other combinations may be provided. While the above description is with regard to one of the printheads at least being of grey level operation, the invention contemplates embodiments where both are binary, see FIG. 4D.

Figure 5:
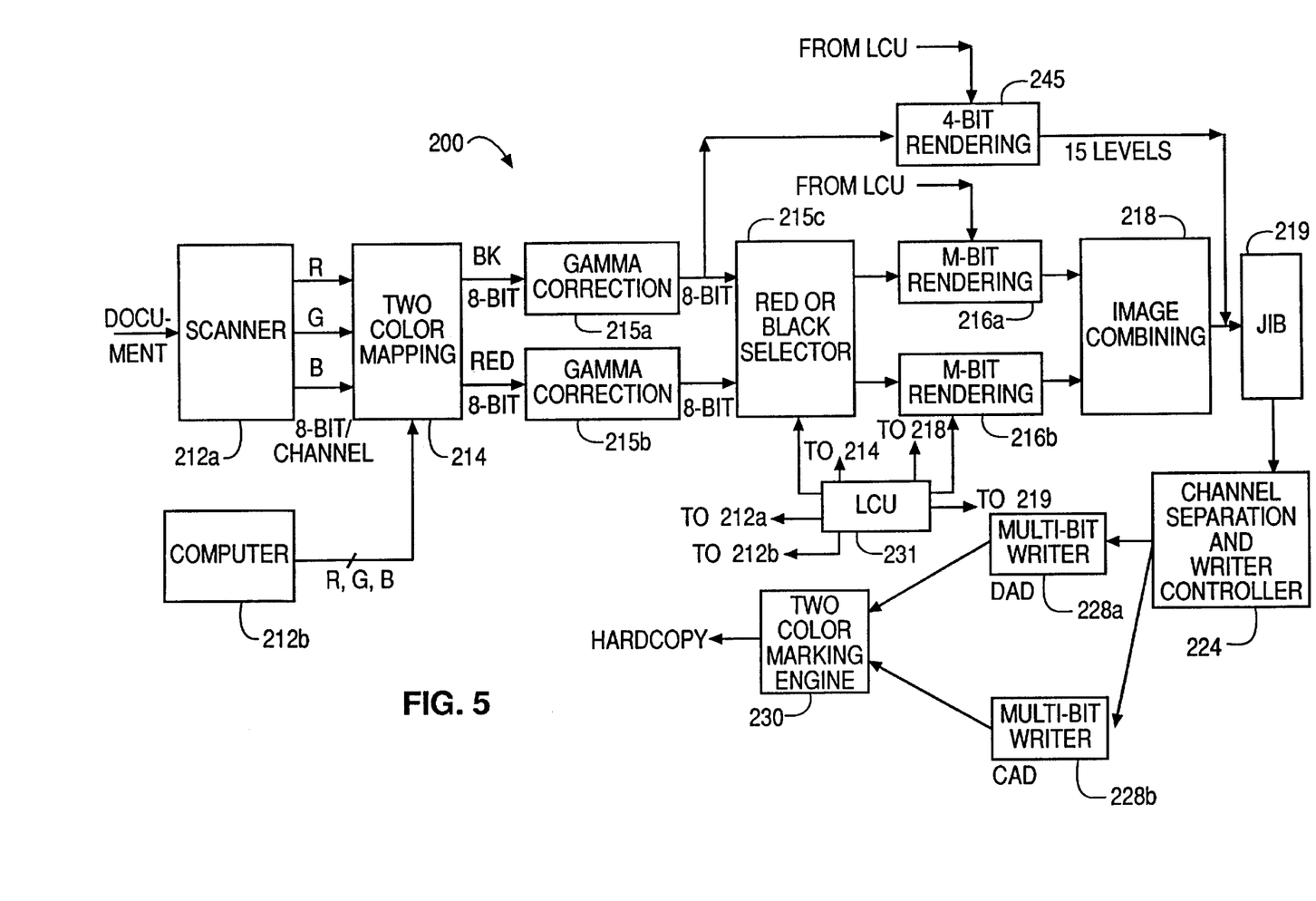
FIG. 5 is a block diagram of an alternate image processing apparatus for processing image data in accordance with the invention.
Figure 8:
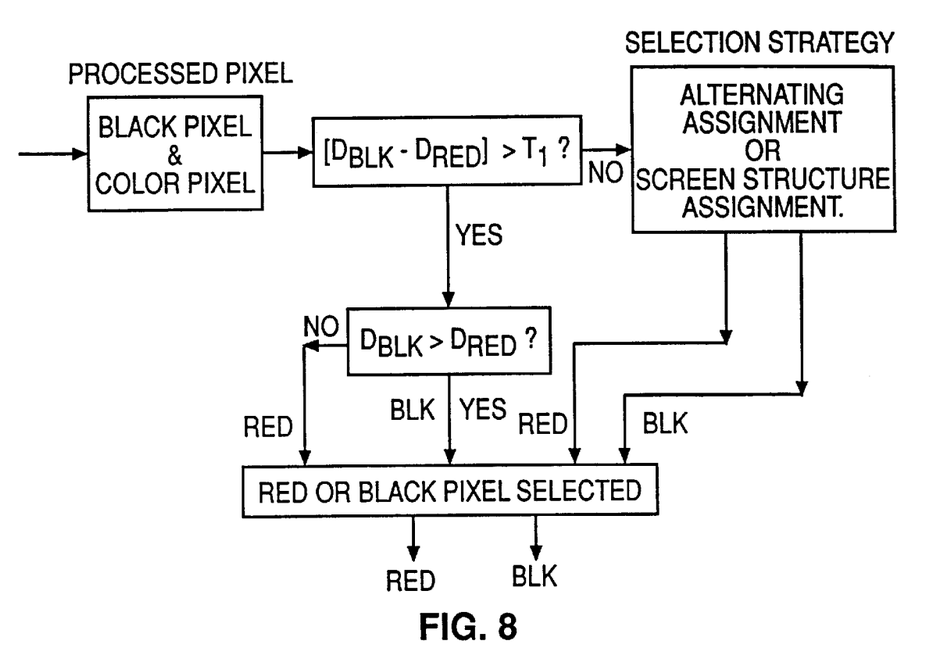
FIGS. 8–10 are flow diagrams of different algorithms for use with the apparatus of FIG. 5 for selecting whether a black pixel or a red pixel is to be recorded at a certain recording location.
Figure 9:
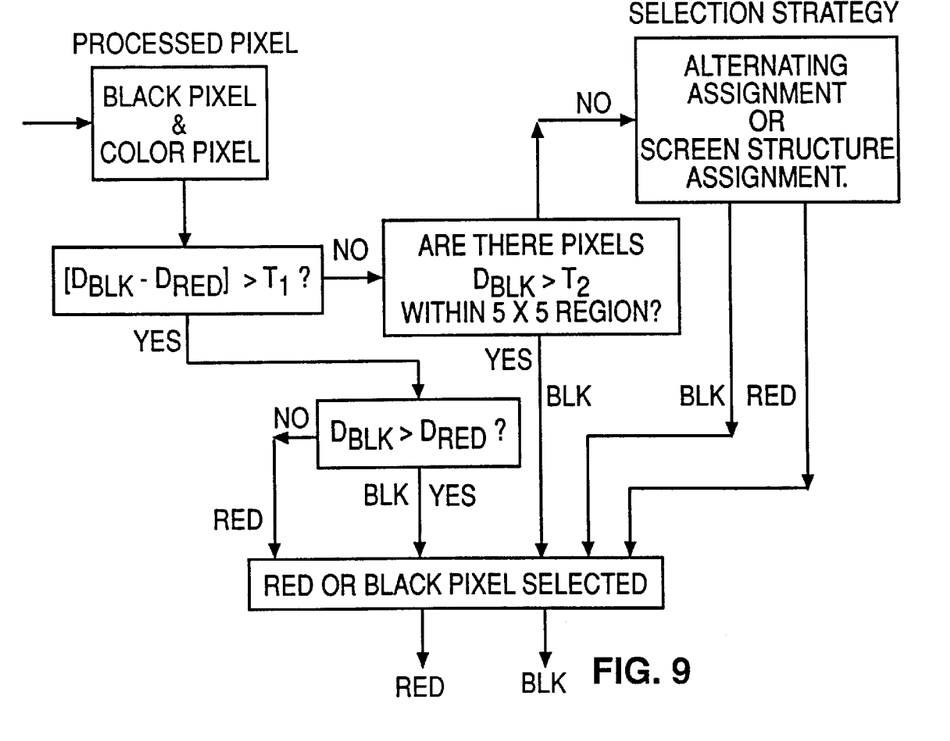
Figure 10:
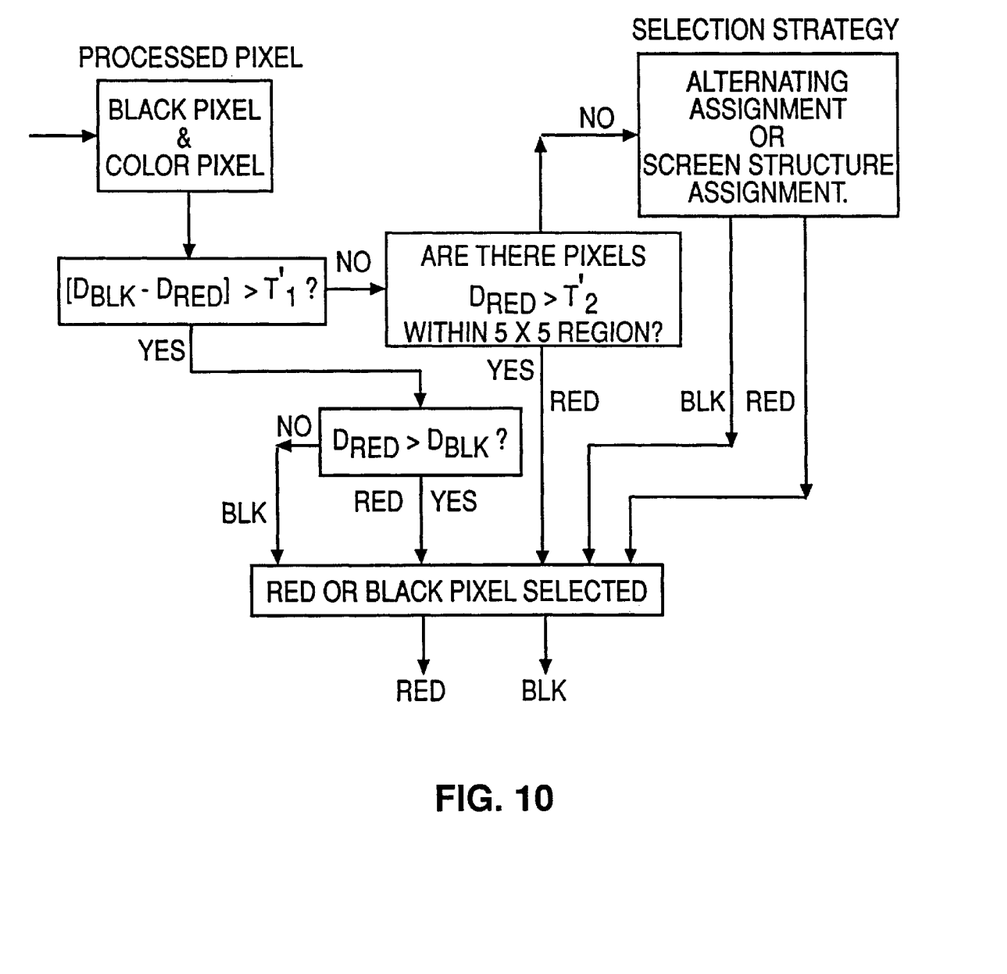

With reference to FIG. 5 there is shown a block diagram of an alternate embodiment of an apparatus 200 of the invention wherein two-color image data is imaged on the same image frame but in a non-overlapping manner. In this embodiment, a determination is made at each pixel location on the image frame that is to be imaged whether or not the pixel is one color or the other. In this embodiment, a data source, which may be of any of those noted above is as an example shown as a document scanner 212a or computer 212b. The output of either data source is pixel data defining a color of each pixel in three color space (say R, G, B) which is converted by two-color mapper 214 to an 8-bits per pixel signal representing conversion of such signal to black and an 8-bits per pixel signal representing conversion of such signal to red. The 8-bit signal representing black and red rendition may be subject to respective gamma correction (blocks 215a, 215b) for the process of the marking engine before input to a circuit 215c for selecting whether the pixel is to be rendered in black or red. Examples of algorithms for selecting black or red for rendering at the particular pixel location are illustrated in FIGS. 8–10 and will be described below. If either black or red is selected for rendering by respective thresholding devices 216a, 216b at the pixel location, the 8-bit signal representing that color may be rendered or thresholded at m bits per pixel, wherein m is a whole number, for example, less than 8. For example, m may be 3. An additional single bit, say binary 0 or 1, is output from the other thresholding device to indicate the color selected at that location. As an example, assume the black or red selector 215c selects black as the pixel to be rendered at that pixel location and the black pixel is rendered at grey level 3. Further, assume in this example that this is a DAD-CAD electrophotographic process where a signal level of 7 is background or white. Thus, a signal level of 10 will print black at grey level 3, since 10 minus 7 is 3. The DAD signal level for each pixel can be expressed digitally as a 4-bit signal from decimal levels 8 through 15 (most exposure). This allows a digital "1" at the most significant bit to identify black as being selected for exposure at this pixel location and thus red (or white) as not being selected at that location. If red (or white) is selected for the pixel at the current pixel location being considered by the selector 215c, the 8-bit per pixel signal representing red is subject to m-bit rendering. But values of red are limited within the range decimal 0 (white and most exposure) through decimal 7 (most dense red and least exposure), thus leaving a digital "0" at the most significant bit to identify this pixel as being selected for exposure in red (or white) and not in black. The rendered red density value is subtracted from 7 to yield the CAD pixel value. When white is to be recorded at that pixel location, the red rendered signal value is 0 which is converted to a CAD exposure value of 7. The grey values for each of the pixel locations are input in the image combiner 218 which maps the pixels for the current page being input. The page of mapped data is then input into the JIB 219 which includes the compressor, mult-page memory for storing compressed rasterized page data and expander as described for the embodiment of FIG. 3 including microcontroller for controlling same. As each page is to be printed, data for that page is read out of memory and into the channel separation and writer controller 224. Each 4-bit nibble of pixel data is examined for its most significant bit (MSB). Each of those pixels having an MSB that is a digital "1" is mapped for the DAD writer 228a. For each such pixel mapped for the DAD writer, a 4-bits per pixel signal of digital "1111" is mapped to the CAD writer to define full exposure at that pixel location which causes no development by toning station 11 at that location. Where the 4-bits per pixel data input to the channel separation and writer controller 224 has an MSB that is digital "0" the pixel data is mapped for the CAD writer 228b. A digital "0000" is then also mapped to the DAD writer 228a to ensure that no exposure causing development is made at that location. The writer controller 224 may be provided with separate page memories to store a page of rasterized data for each of the two-color writers that are to print the page. Preferably, each writer is provided with support of two-page memories so that as data is output from one of the memories for the current page being printed the next page of image data may be in progress of being mapped.

In operation of the marking engine, the respective printheads are operated in accordance with the respective data mapped thereto to record the respective data at the appropriate location on the photoconductive recording medium. The latent electrostatic images are developed with respective colored toners of red and black and transferred to a record member such as plain paper or a transparency.

Since only either a black or a color signal can be exposed on each pixel in the DAD-CAD process of FIG. 5, a decision must be made by processor 215c to choose either a black signal or a color signal. In one embodiment of the composition process illustrated by the flowchart of FIG. 8, the decision is based on the density value (D) of each separate signal. In the following discussion reference will be made with regard to $D_{black}$ or $D_{blk}$, either of which refers to a density value of a black signal, and $D_{red}$ which refers to a density value of a red signal where red is a selected color. Generally, any color may be substituted for red where the color characteristics of the color toner is otherwise different from the black toner. Instead of $D_{red}$, a more general term $D_c$ may be substituted to indicate density of a color signal. In the example of FIG. 8, if $|D_{black}-D_{red}|>T_1$, wherein $T_1$ is a predetermined threshold value chosen through experimentation, and the red signal $D_{red}$ is greater than the black signal $D_{black}$, then the red pixel will be selected and be developed in the CAD process. Otherwise, if $|D_{black}-D_{red}|>T_1$ and the black signal $D_{black}$ is greater than the red signal $D_{red}$, the black pixel will be selected and will be developed in the DAD process. For those pixels that do not meet the above criteria (i.e., those pixels are probably in the lighter tone and less saturated color areas) a black pixel and color pixel are arranged alternately such as in a checkerboard pattern or a screen structure assignment wherein black blocks of pixels are alternated with red blocks of pixels. This strategy ensures that only one-color toner can be developed at each pixel site.

In another embodiment of the composition process illustrated by the flowchart of FIG. 9 and wherein the value of $|D_{black}-D_{red}|$ is not greater than threshold $T_1$, the decision is made such that the pixel resolution is preserved in the black signal along edges. The resultant pixel is selected depending on whether there are several processed black pixels in a neighboring region of pixels (say, 5 pixels in a 5×5 pixel region) that have a density greater than a predefined threshold density $T_2$. If there are several such denser neighboring black pixels existing, then the current pixel has a higher priority to be assigned as a black pixel. Otherwise, the color signal and black signal will be assigned alternately such as a checkerboard pattern. In this arrangement, the black pixels are maintaining the connected integrity in the darker density area. Color fringing due to imperfect scanner response to edges can be eliminated through this embodiment. Furthermore, this alternately assigned color or black pixel can be arranged with screen structure (for example, 141 LPI dot screen structure) for blending smoothly the color pixels and black pixels together.

Similarly, the above practice can be applied to red pixels for maintaining their connected integrity in the color area by programming the algorithm or logic circuit to have a red preference rather than a black preference as provided for in FIG. 10. Thus, with reference to FIG. 10, there is shown a flowchart that is similar to that of FIG. 9; however, in the FIG. 10 embodiment, preference is provided for maintaining connection integrity of color pixels such as red. The threshold density values $T_1$, $T_2$ selected for the process of FIG. 9 need not be the same and are more likely to be different in the process of FIG. 10. Again, these values are chosen through experimentation and are designated in the flowchart as $T_1'$ and $T_2'$. Such preference (red or black) may be selectable by an operator of the copier/printer by inputs via a control panel to a front end Logic and Control Unit (LCU) 231 which then adjusts operation of the program or circuit 215c to either that of FIG. 9 or FIG. 10. The copier/printer of the invention may have the logic operations of FIGS. 8, 9 and 10 be selectable by the operator for use in processing a particular document with a particular one of these logic operations.

The DAD process may also be used in an alternative mode illustrated by by-pass rendering device 245. In this mode where only black is to be printed on the page, the full 4-bits/pixel bit depth can be used. That is levels of decimal 0 through 15 can be defined in this mode and used in a DAD only exposure mode. In such a mode, the CAD writer is made inoperative, the photoconductor is charged to $V_0$ and then exposed by DAD writer 228a and the latent image developed at the pixel areas that are exposed. After rendering by the rendering device the 4-bits per pixel signal is processed by the JIB for storage and when this black only page is to be printed, the data therefor is called out of the JIB, expanded and mapped in the buffer provided with the writer controller 224. From there, it is output to the DAD multibit writer 228a for reproduction on the two-color engine 230, but operating in this frame as a one-color engine. The marking engine 230 is similar to that described in FIG. 1. While the invention has been described above with regard to one JIB for each printer, the advantages of the invention may also be used where there are two or more JIBs. Rather, than having say two JIBs process respective data for different respective colors as would be intuitive from the prior art, instead each JIB would process data for different halves of a page and each JIB would process the data in two colors. Thus, the two JIBs running in parallel can reduce bandwidth requirements for processing pages at a high speed. Plural JIB parallel processing is described in commonly assigned U.S. application Ser. No. 08/276,063 and now U.S. Pat. No. 5,623,585 and a published counterpart thereof is described in GB 2,291,558, the contents of both of these references are incorporated herein by reference thereto.

In the above incorporated by reference documents, there is described a reproduction apparatus such as a copier/ printer that includes a plurality of job image buffers (JIBs). Each JIB includes a compressor for compressing rasterized image data, a memory store for storing compressed rasterized image data and an expander for expanding the compressed rasterized image data. An electronic writer has a plurality of writing components, with each component being associated with a respective segment of an image to be simultaneously recorded. Thus, consider an LED printhead having several thousand individual LED recording elements (LEDs) arranged in a row. A segment of LEDs, say for example one-half of the LEDs on the printhead, may be considered a writing component. A writer interface is operatively connected to the JIBs and the writing components for simultaneously outputting to the writing components data for a respective image segment to be recorded by its respective writing component. A controller controls flow of data to the JIBs so that each of the plural JIBs receives data for only one respective segment of each page of image data. The controller determines which of the JIBs has the most available memory capacity for storing a segment of a page and directs flow of data of a segment of a page meeting a criterion as most busy to the JIB determined to have the most available memory capacity. In an alternative embodiment, the controller rotates the assignment of control segments of pages to different JIBS so that the center segments, which are likely to be the busiest segments and thus least compressible, are not assigned always to the same JIB.

Figure 6:
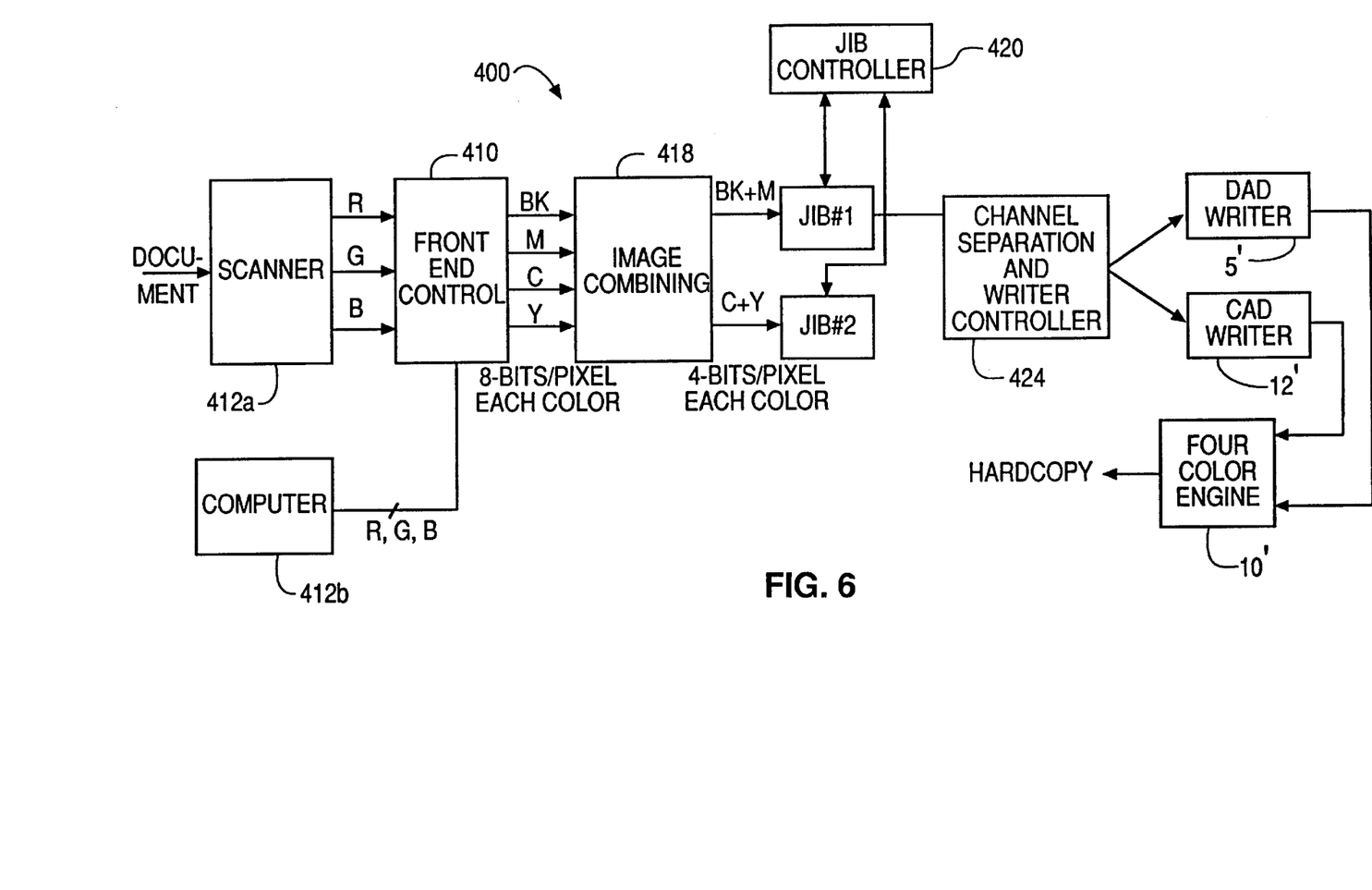
FIG. 6 is a block diagram of still another embodiment of an image processing apparatus for processing image data in a 4-color recording apparatus in accordance with the invention.
Figure 7:
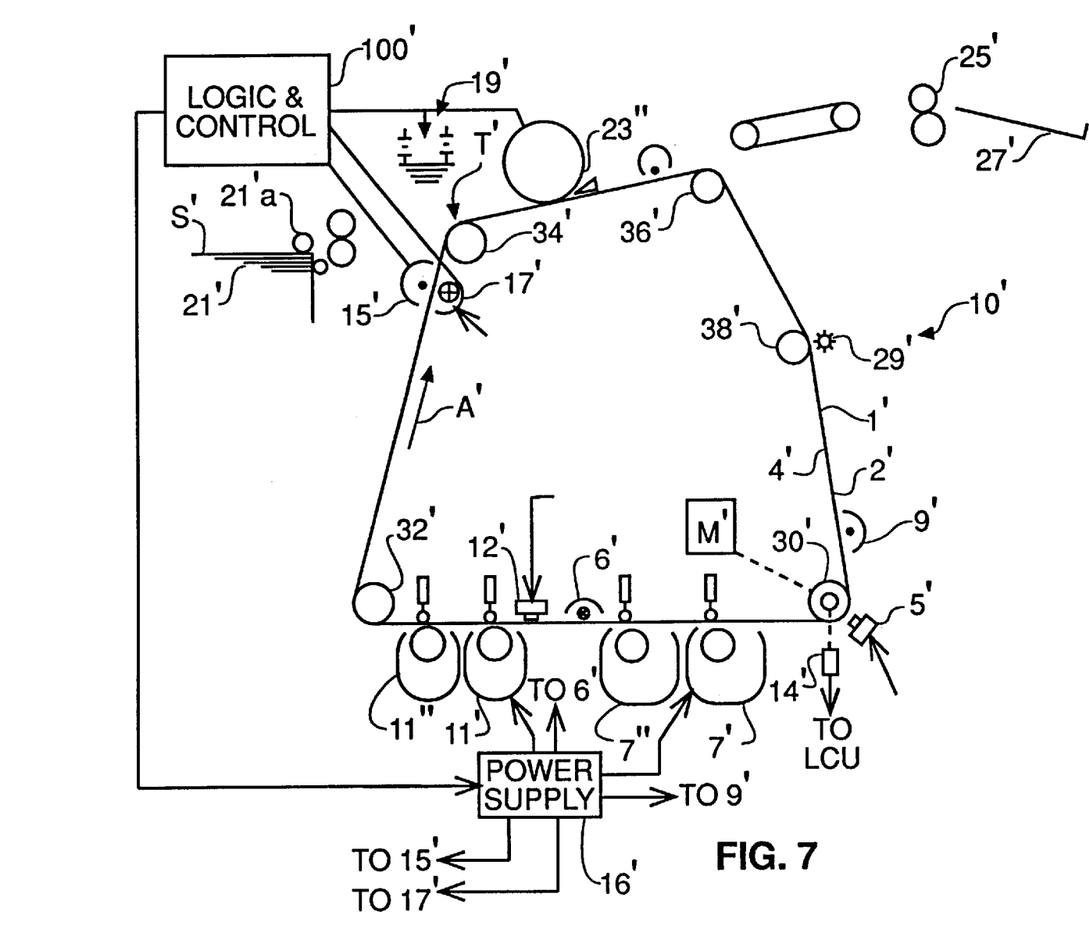
FIG. 7 is an elevation view in schematic of 4-color electrophotographic marking engine that is operative with the apparatus of FIG. 6.

With reference now to FIGS. 6 and 7, there is shown in FIG. 6 a block diagram of an image data processing apparatus 400 for processing four color image data for a four color marking engine 10' shown in FIG. 7. In FIG. 7 structure and items shown therein and identified with a single prime (') correspond to corresponding structure of the apparatus shown in FIG. 1 identified with the same number. The apparatus of FIG. 7 is distinguished from that of FIG. 1 by the incorporation in the former of two additional color development stations 7" and 11" and a larger drum at the transfer station T'; to allow a sheet S' to be transported upon after transfer of a first two-color image thereto for transfer of a second two-color image thereto. The apparatus of FIG. 7 operates similar to that described for FIG. 1 except that on a first image frame a first DAD-CAD two color image is formed and developed using development stations 7' and 11' and upon a second image frame a second DAD-CAD image is formed and developed using development stations 7" and 11". Each DAD-CAD image is formed in accordance with the techniques above. Suitable mechanisms may be associated with the development stations as is known in the art for selectively actuating the development stations in timed relationship with movement of the belt 1'. The two-color images on each image frame are transferred in registered superposed relationship at transfer station T' by movement of the sheet S' into engagement with the toned belt beneath roller 23" for the first two-color transfer. The sheet is then attracted to the transfer drum 23" by vacuum or electrostatic attraction and delivered back into engagement with the belt in timed relationship with the next image frame that supports the second DAD-CAD image for transfer of the developed two-color image formed on the second image frame. The 4-colored images on the sheet S' are then fused by fusing roller 25' to form a 4-color image. Note that in lieu of both image frames having DAD-CAD formed images, one of the image frames can have a DAD-CAD image formed thereon and a second image frame may have a DAD image formed. Also, intermediate transfer drums or belts may be used to which the image or images may be transferred to a receiver sheet.

As may be seen in FIG. 6, a data input device may be in the form of a color document scanner 412a or a computer 412b which outputs signals representing color components of each pixel in terms of R, G. B wherein each color component for each pixel may be represented by 8-bits of data. A front end controller 410 may have integrated therein the functions of gamma correction and color conversion to a different color space such as the 4-color space of magenta, cyan, yellow and black (M,C,Y,BK) wherein each color in this 4-color space is thresholded or otherwise converted to output device dependent form and is say represented by 4-bits per pixel. The black and magenta color components of each pixel may be combined in the image combiner 418 and stored in compressed rasterized form in JIB #1 (419a) as discussed above in the two-color approach. Thus, black and magenta data for each pixel or for adjacent pixels are combined to form a string and compressed. Similarly, the cyan and yellow color components data may be combined and stored in compressed rasterized form in JIB #2 (419b) which is also similar to the JIB structures described above. Data for a first image frame to be recorded is output in expanded form from the JIB #1 to the channel separation and writer controller 424 which may have page memories as described above. Two of these page memories may have data sent thereto and stored therein representing the black and magenta images that can be recorded on a first image frame while the writer controller is mapping data for the cyan and yellow image into the respective other two memories for recording on a second image frame. The channel separation device 424 is operative to separate the black and magenta data to the appropriate channel based on examination of the expanded data. In one example, the most significant bit of a 4-bit byte indicates whether it is black or magenta and the data is sent to the appropriate writer while, for example, data indicating no exposure is sent to the other color channel. Control of processing of the cyan and yellow data may be similar so that the DAD writer 5' records the data for cyan on the second image frame and this is developed by development station 7". The CAD writer 12' is used to record the yellow image on the second image frame and this is developed using development station 11".

There has thus been described an improved apparatus and method for processing and storing image data used in color imaging. While the invention has been described with reference to preferred embodiments employing DAD-CAD electrophotographic processes other such processes as CAD-DAD, DAD-DAD are known using a single image frame to record two colors and may be used to advantage. In addition, processes other than single frame plural color can use the invention. The invention thus is applicable in general to where two or more printheads are used in a printer to print image data and the image data for such printheads can be combined and stored in compressed rasterized form and subsequently expanded losslessly, for printing or for display such as on a CRT or other color electronic display device. In addition, image data for more than two colors may be combined together for compression and storage in the JIB. For example, in a 4-color copier having say 4 printheads image data of one or two bits for each color at each corresponding pixel location say on 4-image frames may be combined together as a block or storing of data, then compressed for storage in the JIB memory and then expanded losslessly, and separated for output to the various color printer channels. As used herein the term "display device" can refer to either a printer or a device that provides a "soft" display of an image such as a CRT or other viewable imaging device.

The invention has been described in detail with particular reference to preferred embodiments thereof, but it will be understood that variations and modifications can be effected within the spirit and scope of the invention.

What is claimed is:

1. A method of processing image data representing plural colors for output to a color display device, comprising the steps of:

generating blocks of digital image data signals representing rasterized image data of at least one pixel said signals representing data for display in at least two colors;

compressing the blocks of digital image data signals;

storing the compressed image data in a compressed form;

expanding the compressed image data;

after the step of expanding separating the expanded image data into separate color channels;

outputting the expanded image data to a color display device wherein the display device comprises two electronic writers and each writer receives data respectively from a respective one of the color channels for recording the data in a different color.

2. The method of claim 1 wherein in the step of compressing, a lossless compression algorithm is employed.

3. The method of claim 1 wherein the two writers record data on one image frame.

4. The method of claim 3 and wherein the image frame is developed with toners of different colors.

5. The method of claim 3 wherein the image data is gray level image data.

6. The method of claim 4 wherein the writers record the data on an electrophotographic marking engine.

7. The method of claim 6 wherein the marking engine records the data in accordance with a DAD-CAD recording operation.

8. The method of claim 7 wherein the writers record image data on a second image frame of the marking engine and the recorded image frame on the second image frame is developed and transferred in registered superposition with the image formed on the one image frame on a receiver sheet.

9. The method of claim 7 wherein the image data representing at least one color is gray level image data.

10. The method of claim 9 and wherein the marking engine records different image data with a DAD only recording operation.

11. The method of claim 1 wherein the image data representing at least one color is gray level image data.

12. A method of processing image data representing plural colors for output to a color display device, comprising:

generating first image data signals representing data for display in two colors, the image data signals representing first pixels of at least one color as grey level image data;

recording and developing the data on a first image frame in an electrophotographic marking engine in accordance with a DAD-CAD recording operation wherein the data for one color is recorded using a first printhead and the data for a second color is recorded using a second printhead;

transferring the developed image to a first receiver sheet;

generating second image data signals representing second image data for display in one color, the image data signals representing second pixels as grey level image data wherein the number of grey levels of said second pixels exceeds the number of grey levels of said first pixels;

recording and developing the second image data on a second image frame of said engine using said first printhead and in accordance with a DAD only recording operation;

developing the image recorded on the second image frame; and transferring the developed image to a second receiver sheet.

13. The method of claim 12 including the step of compressing the first image data signals without differentiating between the data by color; and storing the compressed image data in a memory.

14. An apparatus for processing image data representing plural colors for output to a color display device, comprising:

means for generating blocks of digital image data signals representing rasterized image data of at least one pixel, said signals representing data for display in at least two colors;

means for compressing the block of digital image data;

means for storing the compressed image data in a compressed form;

means for expanding the compressed image data;

means for separating expanded image data into separate color channels;

means for outputting the expanded image data to a color display device; and a color display device, the display device including two electronic writers and each writer receives data respectively from a respective one of the color channels for recording the data in a different color.

15. The apparatus of claim 14 wherein said means for compressing is operative to employ a lossless compression algorithm on the block of digital image data.

16. The apparatus of claim 14 and wherein the two writers are operative to record data on one image frame.

17. The apparatus of claim 16 and means for developing the image frame with toners of different colors.

18. The apparatus of claim 17 in combination with an electrophotographic marking engine and wherein the writers and the means for developing form a part of the engine.

19. The apparatus of claim 18 wherein the marking engine is operative to record the data in accordance with a DAD-CAD recording operation.

20. A method of processing image data representing plural colors for output to a color display device, comprising:

generating blocks of digital image data signals representing rasterized image data of at least one pixel said signals representing data for display in at least two colors;

compressing the blocks of digital image data signals representing data for display in at least two colors without differentiating between the data by color;

storing the compressed image data in a compressed form;

expanding the compressed image data; and outputting the expanded image data to a color display device.

21. The method of claim 20 wherein in the step of compressing, a lossless compression algorithm is employed.

22. The method of claim 21 wherein after the step of expanding the compressed image data, the image data is separated into separate color channels.

23. The method of claim 22 and wherein the display device comprises two electronic writers and each writer receives data respectively from a respective one of the color channels for recording the data in a different color.

24. The method of claim 23 wherein the two writers record data on one image frame.

25. The method of claim 24 and wherein the image frame is developed with toners of different colors.

26. The method of claim 25 wherein the writers record the data on an electrophotographic marking engine.

27. The method of claim 26 wherein the marking engine records the data in accordance with a DAD-CAD recording operation.

28. The method of claim 27 wherein the writers record image data on a second image frame of the marking engine and the recorded image frame on the second image frame is developed and transferred in registered superposition with the image formed on the one image frame on a receiver sheet.

29. The method of claim 20 wherein the image data representing at least one color is gray level image data.

30. The method of claim 20 wherein after the step of expanding the compressed image data, the image data is separated into separate color channels and wherein the display device comprises two electronic writers and each writer receives data respectively from a respective one of the color channels for recording the data in a different color.

31. An apparatus for processing image data representing plural colors for output to a color display device, comprising:

means for generating blocks of digital image data signals representing rasterized image data of at least one pixel, said signals representing data for display in at least two colors;

means for compressing blocks of digital image data representing data for display in at least two colors without differentiating between the data by color;

means for storing the compressed image data in a compressed form;

means for expanding the compressed image data; and means for outputting the expanded image data to a color display device.

32. The apparatus of claim 31 wherein said means for compressing is operative to employ a lossless compression algorithm on the block of digital image data.

33. The apparatus of claim 32 and including means for separating expanded image data into separate color channels.

34. The apparatus of claim 33 in combination with a display device, the display device comprising two electronic writers and each writer receives data respectively from a respective one of the color channels for recording the data in a different color.

35. The apparatus of claim 31 including means for separating the image data into separate color channels and wherein the display device comprises two electronic writers and each writer is operative to receive data respectively from a respective one of the color channels for recording the data in a different color.

* * * * *